US008152868B2

(12) United States Patent
Null

(10) Patent No.: US 8,152,868 B2
(45) Date of Patent: Apr. 10, 2012

(54) FUEL COMPOSITIONS

(75) Inventor: Volker Klaus Null, Hamburg (DE)

(73) Assignee: Shell Oil Company, Houston, TX (US)

( * ) Notice: Subject to any disclaimer, the term of this patent is extended or adjusted under 35 U.S.C. 154(b) by 324 days.

(21) Appl. No.: 12/337,423

(22) Filed: Dec. 17, 2008

(65) Prior Publication Data

US 2009/0158639 A1 Jun. 25, 2009

(30) Foreign Application Priority Data

Dec. 20, 2007 (EP) .................................. 07291619

(51) Int. Cl.
*C10G 71/00* (2006.01)
*C10L 1/18* (2006.01)
*C10L 1/10* (2006.01)

(52) U.S. Cl. ............................... 44/308; 44/309; 208/19
(58) Field of Classification Search .................... 44/308, 44/309; 508/110; 208/19
See application file for complete search history.

(56) References Cited

U.S. PATENT DOCUMENTS

| | | | |
|---|---|---|---|
| 4,208,190 A | 6/1980 | Malec | 44/53 |
| 4,343,692 A | 8/1982 | Winquist | 208/111 |
| 4,574,043 A | 3/1986 | Chester et al. | 208/59 |
| 4,795,546 A | 1/1989 | Miller | 208/97 |
| 4,827,064 A | 5/1989 | Wu | 585/10 |
| 4,859,311 A | 8/1989 | Miller | 208/89 |
| 4,943,672 A | 7/1990 | Hamner et al. | 585/737 |
| 5,053,373 A | 10/1991 | Zones | 502/64 |
| 5,059,299 A | 10/1991 | Cody et al. | 208/27 |
| 5,157,191 A | 10/1992 | Bowes et al. | 585/533 |
| 5,252,527 A | 10/1993 | Zones | 502/64 |
| 5,490,864 A | 2/1996 | Herbstman et al. | 44/379 |
| 6,165,949 A | 12/2000 | Berlowitz et al. | 508/363 |
| 6,663,767 B1 | 12/2003 | Berlowitz et al. | 208/18 |
| 7,053,254 B2 | 5/2006 | Miller | 585/1 |
| 2002/0062053 A1 | 5/2002 | Berlowitz et al. | 585/14 |
| 2004/0045868 A1 | 3/2004 | Germaine | 208/58 |
| 2004/0065581 A1 | 4/2004 | Jiang et al. | 208/18 |
| 2005/0098476 A1 | 5/2005 | Miller | 208/19 |
| 2005/0210739 A1 | 9/2005 | Esen et al. | 44/605 |
| 2006/0196109 A1* | 9/2006 | Morton et al. | 44/393 |
| 2006/0201851 A1* | 9/2006 | Rosenbaum et al. | 208/18 |
| 2006/0219597 A1 | 10/2006 | Bishop et al. | 208/15 |
| 2007/0100177 A1 | 5/2007 | Clark et al. | 585/14 |
| 2009/0158641 A1 | 6/2009 | Hayes et al. | 44/309 |

FOREIGN PATENT DOCUMENTS

| | | |
|---|---|---|
| AU | 698391 | 1/1997 |
| CA | 2242517 | 1/1999 |
| EP | 147240 | 7/1985 |
| EP | 482253 | 4/1992 |
| EP | 613938 | 9/1994 |
| EP | 0668342 | 8/1995 |
| EP | 0776959 | 6/1997 |
| EP | 0532118 | 5/1999 |
| EP | 0712922 | 2/2000 |
| EP | 0666894 | 11/2000 |
| EP | 0583836 | 2/2002 |
| EP | 1366134 | 12/2003 |
| EP | 1382639 | 1/2004 |
| EP | 1548088 | 6/2005 |
| EP | 1534801 | 1/2006 |
| EP | 1645615 | 4/2006 |
| EP | 1516038 | 8/2006 |
| EP | 1686164 | 8/2006 |
| GB | 960493 | 6/1964 |
| GB | 2433072 | 6/2007 |
| WO | WO9306194 | 4/1993 |
| WO | WO9417160 | 8/1994 |
| WO | WO9533805 | 12/1995 |
| WO | WO9641849 | 12/1996 |
| WO | WO9718278 | 5/1997 |
| WO | WO9801516 | 1/1998 |
| WO | WO9842808 | 10/1998 |
| WO | WO9920720 | 4/1999 |
| WO | WO9934917 | 7/1999 |
| WO | WO0014179 | 3/2000 |
| WO | WO0014184 | 3/2000 |
| WO | WO0029511 | 5/2000 |
| WO | WO02064710 | 8/2002 |
| WO | WO02070627 | 9/2002 |
| WO | WO03004588 | 1/2003 |
| WO | WO03070857 | 8/2003 |
| WO | WO2004000975 | 12/2003 |
| WO | WO2004003113 | 1/2004 |
| WO | WO2004033607 | 4/2004 |
| WO | WO2005054411 | 6/2005 |
| WO | WO2005063941 | 7/2005 |
| WO | WO2006003119 | 1/2006 |
| WO | WO2006040319 | 4/2006 |
| WO | WO2006122978 | 11/2006 |
| WO | WO2007028947 | 3/2007 |
| WO | WO2007065512 | 6/2007 |
| WO | WO2008135602 | 11/2008 |
| WO | WO2009068539 | 6/2009 |

OTHER PUBLICATIONS

Damping Wie and H. A. Spikes, "The Lubricity of Diesel Fuels," *Wear*, 111 (1986) pp. 217-235.
Maarten van der Burgt, Jaap van Klinken, Tjong Sie, "The Shell Middle Distillate Synthesis Process," Nov. 1989.
Maarten van der Burgt, Jaap van Klinken, S. T. Sie, "The Shell Middle Distillate Synthesis Process," Nov. 1985.
International Search Report dated Jun. 4, 2008.

* cited by examiner

*Primary Examiner* — Walter D Griffin
*Assistant Examiner* — Francis C Campanell

(57) ABSTRACT

Middle distillate fuel composition is provided containing (a) a middle distillate base fuel comprising at least in part a biodiesel fuel component, and (b) a Fischer-Tropsch derived paraffinic base oil component with a viscosity of at least 8 $mm^2/s$ at 100° C.

14 Claims, No Drawings

FUEL COMPOSITIONS

This application claims the benefit of European Application No. 07291619.0 filed Dec. 20, 2007.

FIELD OF THE INVENTION

The present invention relates to middle distillate fuel compositions and to their preparation and uses, as well as to the use of certain types of fuel component in the fuel compositions.

BACKGROUND OF THE INVENTION

Evaporation of a fuel, which contains a less volatile blend component (i.e. heavier than the fuel molecules or more polar), leads to an uneven distribution of fuel components, whereby the less volatile components tend to enrich in the non-evaporated residue. In combustion engines, the combustion itself will convert most of the fuel material; however, a small amount of the remaining liquid will remain non-combusted in the combustion chamber or on the wall. This is then washed out by and accumulated in the lubricating engine oil. The effect of this fuel dilution is enhanced when the piston rings are worn or defective, since more fuel might directly be pushed past the piston rings into the lubricating engine oil.

So-called "biodiesel" fuel components such as a vegetable oil or vegetable oil derivative (e.g. a fatty acid ester, in particular a fatty acid methyl ester (FAME)), or another oxygenate such as an acid, ketone or ester, are usually less volatile than hydrocarbons usually present in mineral oil derived fuels. The mandatory presence of such renewable fuel components, in particular FAME, has led to an increase of the presence of such components in the lubricating engine oil. This, however, leads to a more rapid breakdown of the lubricating engine oil.

The effects of the enrichment of fuel components in the engine lubricating oil include viscosity reduction due to fuel dilution; sludge and varnish formation; depletion of the alkalinity reserve in the lubricating base oil, as indicated by total base number decrease; a more rapid increase in total acid number, indicating oil degradation due to more nitric acid formation; and leaching of certain metals such as copper and lead from bearings due to the higher solvency of the lubricant base oil comprising the biodiesel component. Other effects are related to the presence of exhaust gas turbochargers as applied in modern diesel engines. Here the biodiesel components carbonise under the elevated temperatures occurring in the turbocharger bearings, resulting eventually in failing bearings and/or seals.

This is further enhanced by the extended oil drain intervals usually applied. In the worst case, even a catastrophic failure of the engine lubricating oil may occur due to gelation or plugging of oil filters from excessive sludge formation. As a result, the oil drain intervals would need to be shortened to avoid lubricant contamination likely to produce engine damage.

SUMMARY OF THE INVENTION

A middle distillate fuel composition is provided comprising (a) a middle distillate base fuel comprising at least in part a biodiesel fuel component, and (b) a Fischer-Tropsch derived paraffinic base oil component with a viscosity of at least 8 mm$^2$/s at 100° C.

DETAILED DESCRIPTION OF THE INVENTION

It would be highly desirable to have a fuel composition that counterbalances the problems described above. It would further be highly desirable to be able to maintain or increase the lubricating engine oil drain intervals.

This has been achieved by employing a heavy component having a high viscosity (i.e. above a certain value) as fuel additive that will enrich the engine lubricating oil, thereby effectively adding to the engine lubricating oil.

According to the present invention there is, therefore, provided a middle distillate fuel composition containing (a) a middle distillate base fuel comprising at least in part a biodiesel fuel component such as a vegetable oil, hydrated vegetable oil or vegetable oil derivative (e.g. a fatty acid ester, in particular a fatty acid methyl ester (FAME)) or another oxygenate such as an acid, ketone or ester, and (b) a Fischer-Tropsch derived paraffinic base oil component with a viscosity of at least 8 mm$^2$/s at 100° C.

It has been found that the inclusion of a Fischer-Tropsch derived paraffinic base oil component with a viscosity of at least 8 mm$^2$/s at 100° C. in a middle distillate fuel composition further comprising a biodiesel fuel component, such as an oxygenated fatty acid methyl ester or vegetable oil, or another oxygenate, such as an acid, ketone or ester, can lead to an improvement of the lubricant properties of an engine run with the fuel composition.

The Fischer-Tropsch condensation process is a reaction which converts carbon monoxide and hydrogen into longer chain, usually paraffinic, hydrocarbons in the presence of an appropriate catalyst and typically at elevated temperatures (e.g. 125 to 300° C., preferably 175 to 250° C.) and/or pressures (e.g. 5 to 100 bar, preferably 12 to 50 bar). The carbon monoxide and hydrogen may themselves be derived from organic or inorganic, natural or synthetic sources, typically either from natural gas or from organically derived methane. In general, the gases which are converted into liquid fuel components using Fischer-Tropsch processes can include natural gas (methane), LPG (e.g. propane or butane), "condensates"such as ethane, synthesis gas (carbon monoxide/hydrogen) and gaseous products derived from coal, biomass and other hydrocarbons.

The Fischer-Tropsch process can be used to prepare a range of hydrocarbon fuels, including LPG, naphtha, kerosene and gas oil fractions. Of these, the gas oils have been used as, and in, automotive diesel fuel compositions, typically in blends with petroleum derived gas oils. The heavier fractions can yield, following hydroprocessing and vacuum distillation, a series of base oils having different distillation properties and viscosities, which are useful as lubricating base oil stocks.

Preferably, the Fischer-Tropsch derived paraffinic base oil component is a heavy residual base oil, due to the high increase in viscosity it may provide to a biodiesel component contaminated lubricant base oil.

An example of such a Fischer-Tropsch derived paraffinic base oil component is an extra heavy base oil residue component with a viscosity of at least 8 mm$^2$/s (at 100° C.) ex. Shell Bintulu.

Distillate Fischer-Tropsch derived base oils, such as those disclosed in EP-A-1366134, provide a similar effect, but would have to be present in the fuel in a higher amount due to their inherently higher volatility and lower viscosity.

The higher molecular weight, so-called residual "bottoms" product that remains after recovering the lubricating base oil cuts from the vacuum column is usually recycled to a hydrocracking unit for conversion into lower molecular weight products, often being considered unsuitable for use as a lubricating base oil itself.

Such bottoms products have also been proposed for use as additives in distillate base oils, as in U.S. Pat. No. 7,053,254 where a Fischer-Tropsch bottoms-derived additive is used to improve the lubricating properties of a distillate base oil and in particular to reduce its pour point.

It has now surprisingly been found, however, that an appropriately processed Fischer-Tropsch base oil, preferably a residual or bottoms-derived base oil (hereinafter referred to as a "Fischer-Tropsch derived heavy base oil") can actually improve the properties of a lubricant composition when employed in a middle distillate fuel composition further comprising a biodiesel component.

In the context of the present invention, a Fischer-Tropsch derived paraffinic heavy base oil is suitably a base oil which has been derived, whether directly or indirectly following one or more downstream processing steps, from a Fischer-Tropsch "bottoms" (i.e. high boiling) product. A Fischer-Tropsch bottoms product is a hydrocarbon product recovered from the bottom of a fractionation column, usually a vacuum column, following fractionation of a Fischer-Tropsch derived feed stream.

In more general terms, the term "Fischer-Tropsch derived" means that a material is, or derives from, a synthesis product of a Fischer-Tropsch condensation process. The term "non-Fischer-Tropsch derived" may be interpreted accordingly. A Fischer-Tropsch derived fuel or fuel component will, therefore, be a hydrocarbon stream in which a substantial portion, except for added hydrogen, is derived directly or indirectly from a Fischer-Tropsch condensation process.

Hydrocarbon products may be obtained directly from the Fischer-Tropsch reaction, or indirectly, for instance by fractionation of Fischer-Tropsch synthesis products or from hydrotreated Fischer-Tropsch synthesis products. Hydrotreatment can involve hydrocracking to adjust the boiling range and/or hydroisomerisation which can improve cold flow properties by increasing the proportion of branched paraffins. Other post-synthesis treatments, such as polymerisation, alkylation, distillation, cracking-decarboxylation, isomerisation and hydroreforming, may be employed to modify the properties of Fischer-Tropsch condensation products.

Typical catalysts for the Fischer-Tropsch synthesis of paraffinic hydrocarbons comprise, as the catalytically active component, a metal from Group VIII of the periodic table, in particular ruthenium, iron, cobalt or nickel. Suitable such catalysts are described, for instance, in EP-A-0583836 (pages 3 and 4).

An example of a Fischer-Tropsch based process is the SMDS (Shell Middle Distillate Synthesis) described in "The Shell Middle Distillate Synthesis Process", van der Burgt et al, paper delivered at the 5th Synfuels Worldwide Symposium, Washington D.C., November 1985 (see also the November 1989 publication of the same title from Shell International Petroleum Company Ltd, London, UK). This process (also sometimes referred to as the Shell "Gas-To-Liquids" or "GTL" technology) produces middle distillate range products by conversion of a natural gas (primarily methane) derived synthesis gas into a heavy long chain hydrocarbon (paraffin) wax, which can then be hydroconverted and fractionated to produce liquid transport fuels such as the gas oils useable in diesel fuel compositions. Base oils, including heavy base oils, may also be produced by such a process. A version of the SMDS process, utilizing a fixed bed reactor for the catalytic conversion step, is currently in use in Bintulu, Malaysia, and its gas oil products have been blended with petroleum derived gas oils in commercially available automotive fuels.

By virtue of the Fischer-Tropsch process, a Fischer-Tropsch derived fuel or fuel component has essentially no, or undetectable levels of, sulphur and nitrogen. Compounds containing these heteroatoms tend to act as poisons for Fischer-Tropsch catalysts and are, therefore, removed from the synthesis gas feed. This can bring additional benefits to fuel compositions in accordance with the present invention.

Further, the Fischer-Tropsch process as usually operated produces no or virtually no aromatic components. The aromatics content of a Fischer-Tropsch derived fuel component, suitably determined by ASTM D-4629, will typically be below 1 wt %, preferably below 0.5 wt % and more preferably below 0.1 wt %, on a molecular (as opposed to atomic) basis.

The relatively high viscosity and inherent lubricity of Fischer-Tropsch derived component (b) can also improve the properties and performance of fuel compositions, in particular providing additional upper ring pack lubrication and enhanced fuel economy. Thus, the inclusion of such components in a diesel fuel composition according to the present invention can have a number of benefits.

The Fischer-Tropsch derived paraffinic heavy base oil component (b) used in a fuel composition according to the present invention is a heavy hydrocarbon product comprising at least 95 wt % paraffin molecules. Preferably, the heavy base oil component (b) is prepared from a Fischer-Tropsch wax and comprises more than 98 wt % of saturated, paraffinic hydrocarbons. Preferably at least 85 wt %, more preferably at least 90 wt %, yet more preferably at least 95 wt %, and most preferably at least 98 wt % of these paraffinic hydrocarbon molecules are isoparaffinic. Preferably, at least 85 wt % of the saturated, paraffinic hydrocarbons are non-cyclic hydrocarbons. Naphthenic compounds (paraffinic cyclic hydrocarbons) are preferably present in an amount of no more than 15 wt %, more preferably less than 10 wt %.

Component (b) suitably contains hydrocarbon molecules having consecutive numbers of carbon atoms, such that it comprises a continuous series of consecutive iso-paraffins, i.e. iso-paraffins having n, n+1, n+2, n+3 and n+4 carbon atoms. This series is a consequence of the Fischer-Tropsch hydrocarbon synthesis reaction from which the heavy base oil derives, following isomerisation of the wax feed. Alternatively, similar poly alpha-olefin polymers may be employed as component (b). However, these are less preferred due to their high cost, and lower biological degradability.

Component (b) is typically a liquid at the temperature and pressure conditions of use and typically, although not always, under ambient conditions, i.e. at 25° C. and 101 kPa (one atmosphere) pressure.

The kinematic viscosity at 100° C. (VK100) of component (b), as measured according to ASTM D-445, should be at least 8 mm$^2$/s (8 cSt). Preferably, its VK100 is at least 10 mm$^2$/s (10 cSt), more preferably at least 13 mm$^2$/s (13 cSt), yet more preferably at least 15 mm$^2$/s (15 cSt), again more preferably at least 17 mm$^2$/s (17 cSt), and yet again more preferably at least 20 mm$^2$/s (20 cSt). Kinematic viscosities described in this specification were determined according to ASTM D-445, whilst viscosity indices (VI) were determined using ASTM D-2270.

The boiling range distribution of samples having a boiling range above 535° C. was measured according to ASTM D-6352, while for lower boiling materials, the boiling range distributions were measured according to ASTM D-2887.

Component (b) preferably has an initial boiling point of at least 400° C. More preferably, its initial boiling point is at least 450° C., yet more preferably at least 480° C.

The initial boiling point values referred to herein are nominal and refer to the T5 cut-points (boiling temperatures) obtained by gas chromatograph simulated distillation (GCD).

Since conventional petroleum derived hydrocarbons and Fischer-Tropsch derived hydrocarbons comprise a mixture of varying molecular weight components having a wide boiling range, this disclosure will refer to the 10 wt % recovery point and the 90 wt % recovery point of the respective boiling ranges. The 10 wt % recovery point refers to that temperature at which 10 wt % of the hydrocarbons present within that cut will vaporise at atmospheric pressure, and could thus be recovered. Similarly, the 90 wt % recovery point refers to the temperature at which 90 wt % of the hydrocarbons present will vaporise at atmospheric pressure. When referring to a boiling range distribution, the boiling range between the 10 wt % and 90 wt % recovery boiling points is referred to in this specification. Molecular weights referred to in this specification were determined according to ASTM D-2503.

Component (b) according to the present invention preferably contains molecules having consecutive numbers of carbon atoms and preferably at least 95 wt % C30+hydrocarbon molecules. More preferably, component (b) contains at least 75 wt % of C35+ hydrocarbon molecules.

"Cloud point" refers to the temperature at which a sample begins to develop a haze, as determined according to ASTM D-5773. Component (b) typically has a cloud point between +49° C. and −60° C. Preferably, component (b) has a cloud point between +30° C. and −55° C., more preferably between +10° C. and −50° C. It has been found that, depending on the feed and the dewaxing conditions, some of the Fischer-Tropsch derived paraffinic heavy base oil component (b) could have a cloud point above ambient temperature, while other properties are not negatively affected.

Component (b) preferably has a viscosity index of between 120 and 160. It will preferably contain no or very little sulphur and nitrogen containing compounds. As described above, this is typical for a product derived from a Fischer-Tropsch reaction, which uses synthesis gas containing almost no impurities.

Preferably, component (b) comprises sulphur, nitrogen and metals in the form of hydrocarbon compounds containing them, in amounts of less than 50 ppmw (parts per million by weight), more preferably less than 20 ppmw, yet more preferably less than 10 ppmw. Most preferably, it will comprise sulphur and nitrogen at levels generally below the detection limits, which are currently 5 ppmw for sulphur and 1 ppmw for nitrogen, when using, for instance, X-ray or 'Antek' Nitrogen tests for determination. However, sulphur may be introduced through the use of sulphided hydrocracking/hydrodewaxing and/or sulphided catalytic dewaxing catalysts.

The Fischer-Tropsch derived paraffinic heavy base oil component (b) used in the present invention is preferably separated as a residual fraction from the hydrocarbons produced during a Fischer-Tropsch synthesis reaction and subsequent hydrocracking and dewaxing steps.

More preferably, this fraction is a distillation residue comprising the highest molecular weight compounds still present in the product of the hydroisomerisation step. The 10 wt % recovery boiling point of said fraction is preferably above 370° C., more preferably above 400° C. and most preferably above 500° C. for certain embodiments of the present invention.

Component (b) can further be characterised by its content of different carbon species. More particularly, component (b) can be characterised by the percentage of its epsilon methylene carbon atoms, i.e. the percentage of recurring methylene carbons which are four or more carbons removed from the nearest end group and also from the nearest branch (further referred to as CH2>4) as compared to the percentage of its isopropyl carbon atoms. In the following text, the ratio of the percentage of epsilon methylene carbon atoms to the percentage of isopropyl carbon atoms (i.e. carbon atoms in isopropyl branches), as measured for the base oil as a whole, is referred to as the epsilon:isopropyl ratio.

It has been found that isomerised Fischer-Tropsch bottoms products as disclosed in U.S. Pat. No. 7,053,254 differ from Fischer-Tropsch derived paraffinic base oil components obtained at a higher dewaxing severity, in that the latter compounds have an epsilon:isopropyl ratio of 8.2 or below. It has been found that a measurable pour point depressing effect through base stock blending, as disclosed in U.S. Pat. No. 7,053,254, can only be achieved if in the base oil, the epsilon:isopropyl ratio is 8.2 or above. It is noted that where no pour point reducing effect in a base stock is desired, the addition of a Fischer-Tropsch derived heavy base oil component (b) having a lower pour point and a higher content of compounds having an epsilon:isopropyl ratio of 8.2 or below may be beneficial, since such blends tend to be more homogeneous, as expressed by their lower cloud points.

It has also been found that there appears to be a correlation between the kinematic viscosity, the pour point and the pour point depressing effect of an isomerised Fischer-Tropsch derived bottoms product. At a given feed composition and boiling range (as defined by the lower cut point from the distillate base oil and gas oil fractions after dewaxing) for the bottoms product, the pour point and the obtainable viscosity are linked to the severity of the dewaxing treatment. It has been found that a pour point depressing effect is noticeable for isomerised Fischer-Tropsch derived bottoms products having a pour point of above −28° C., an average molecular weight between about 600 and about 1100 and an average degree of branching in the molecules of between about 6.5 and about 10 alkyl branches per 100 carbon atoms, as disclosed in U.S. Pat. No. 7,053,254.

The Fischer-Tropsch derived heavy base oil component (b) used in a composition according to the present invention may, however, have a pour point of below +6° C., or in cases even lower, and has suitably been subjected to relatively severe dewaxing. It further preferably has an average degree of branching in the molecules of above 10 alkyl branches per 100 carbon atoms, as determined in line with the method disclosed in U.S. Pat. No. 7,053,254. Such a component tends to have no or only a negligible pour point depressing effect, such that the pour points of blends comprising components (a) and (b) lie between the pour points of the two components.

"Pour point" refers to the temperature at which a base oil sample will begin to flow under carefully controlled conditions. The pour points referred to herein were determined according to ASTM D-97-93.

In cases the heavy base oil component (b) used in the present invention may have a pour point of −8° C. or lower, preferably of −10 or −15 or −20 or −25 or −28 or even −30 or −35 or −40 or −45° C. or lower. It may thus be a base oil of the type which has been subjected to relatively severe (i.e. high temperature catalytic) dewaxing, such as can result in a pour point of −30° C. or below, for example from −30 to −45° C., as opposed to the type which has been subjected to relatively mild dewaxing to result in a pour point of around −6° C. The latter type is known for use as a pour point depressant, whereas the former is not generally used for this purpose, making the results obtained according to the present invention even more surprising.

The branching properties as well as the carbon composition of a Fischer-Tropsch derived base oil blending component can conveniently be determined by analysing a sample of the oil using $^{13}$C-NMR, vapour pressure osmometry (VPO) and field ionisation mass spectrometry (FIMS).

The density of the heavy base oil component (b) at 15° C., as measured by the standard test method EN ISO 12 185, is suitably from about 700 to 1100 kg/m³, preferably from about 837 to 841 kg/m³.

In its broadest sense, the present invention embraces the use of a paraffinic heavy base oil component having one or more of the above described properties, whether or not the component is Fischer-Tropsch derived.

A fuel composition according to the present invention may contain a mixture of two or more Fischer-Tropsch derived paraffinic heavy base oil components.

In order to prepare a paraffinic heavy base oil for use in the present invention, a Fischer-Tropsch derived bottoms product is suitably subjected to an isomerisation process. This converts n- to iso-paraffins, thus increasing the degree of branching in the hydrocarbon molecules and improving cold flow properties. Depending on the catalysts and isomerisation conditions used, it can result in long chain hydrocarbon molecules having relatively highly branched end regions. Such molecules tend to exhibit relatively good cold flow performance.

The isomerised bottoms product may undergo further downstream processes, for example hydrocracking, hydrotreating and/or hydrofinishing. It is preferably subjected to a dewaxing step, either by solvent or more preferably by catalytic dewaxing, as described below, which serves further to reduce its pour point. However, even after dewaxing, a Fischer-Tropsch derived heavy base oil will still have a residual wax haze due to the extremely high molecular weight molecules which the dewaxing process cannot completely remove, and for this reason it is surprising that such oils can cause a reduction, as opposed to the expected increase, in CFPP when blended with middle distillate base fuels.

In general, a Fischer-Tropsch derived paraffinic heavy base oil for use in a composition according to the present invention may be prepared by any suitable Fischer-Tropsch process. Preferably, however, the paraffinic heavy base oil component (b) is a heavy bottom distillate fraction obtained from a Fischer-Tropsch derived wax or waxy raffinate feed by:

(a) hydrocracking/hydroisomerising a Fischer-Tropsch derived feed, wherein at least 20 wt % of compounds in the Fischer-Tropsch derived feed have at least 30 carbon atoms;

(b) separating the product of step (a) into one or more distillate fraction(s) and a residual heavy fraction comprising at least 10 wt % of compounds boiling above 540° C.;

(c) subjecting the residual fraction to a catalytic pour point reducing step; and (d) isolating from the effluent of step (c), as a residual heavy fraction, the Fischer-Tropsch derived paraffinic heavy base oil component.

In addition to isomerisation and fractionation, the Fischer-Tropsch derived product fractions may undergo various other operations, such as hydrocracking, hydrotreating and/or hydrofinishing.

The feed from step (a) is a Fischer-Tropsch derived product. The initial boiling point of the Fischer-Tropsch product may be up to 400° C., but is preferably below 200° C. Preferably, any compounds having 4 or fewer carbon atoms and any compounds having a boiling point in that range are separated from a Fischer-Tropsch synthesis product before the Fischer-Tropsch synthesis product is used in said hydroisomerisation step. An example of a suitable Fischer-Tropsch process is described in WO-A-99/34917 and in AU-A-698391. The disclosed processes yield a Fischer-Tropsch product as described above.

The Fischer-Tropsch product can be obtained by well-known processes, for example the so-called Sasol process, the Shell Middle Distillate Process or the ExxonMobil "AGC-21" process. Suitable processes for the production of heavy Fischer-Tropsch derived base oils are described in WO-A-2004/033607, U.S. Pat. No. 7,053,254, EP-A-1366134, EP-A-1382639, EP-A-1516038, EP-A-1534801, WO-A-2004/003113 and WO-A-2005/063941.

The middle distillate fuel composition according to the present invention may be, for example, a naphtha, kerosene or diesel fuel composition, typically either a kerosene or a diesel fuel composition. It may be an industrial gas oil, an automotive diesel fuel, a distillate marine fuel or a kerosene fuel such as an aviation fuel. It may, in particular, be a diesel fuel composition. Preferably, it is for use in an engine such as an automotive engine or an aeroplane engine. More preferably, it is suitable and/or adapted and/or intended for use in an internal combustion engine; yet more preferably, it is an automotive fuel composition, still more preferably a diesel fuel composition which is suitable and/or adapted and/or intended for use in an automotive diesel (compression ignition) engine.

The middle distillate base fuel which it contains may in general be any suitable liquid hydrocarbon middle distillate fuel oil. It may be organically or synthetically derived. It is suitably a diesel base fuel, for example a petroleum derived or Fischer-Tropsch derived gas oil (preferably the former).

A middle distillate base fuel will typically have boiling points within the usual middle distillate range of 125 or 150 to 400 or 550° C.

A diesel base fuel will typically have boiling points within the usual diesel range of 170 to 370° C., depending on grade and use. It will typically have a density from 0.75 to 1.0 g/cm³, preferably from 0.8 to 0.86 g/cm³, at 15° C. (IP 365) and a measured cetane number (ASTM D-613) of from 35 to 80, more preferably from 40 to 75 or 70. Its initial boiling point will suitably be in the range 150 to 230° C. and its final boiling point in the range 290 to 400° C. Its kinematic viscosity at 40° C. (ASTM D-445) might suitably be from 1.5 to 4.5 mm²/s (1.5 to 4.5 centistokes). However, a diesel fuel composition according to the present invention may contain fuel components with properties outside these ranges, since the properties of an overall blend may differ, often significantly, from those of its individual constituents.

A petroleum derived gas oil may be obtained by refining and optionally (hydro)processing a crude petroleum source. It may be a single gas oil stream obtained from such a refinery process or a blend of several gas oil fractions obtained in the refinery process via different processing routes. Examples of such gas oil fractions are straight run gas oil, vacuum gas oil, gas oil as obtained in a thermal cracking process, light and heavy cycle oils as obtained in a fluid catalytic cracking unit and gas oil as obtained from a hydrocracker unit. Optionally, a petroleum derived gas oil may comprise some petroleum derived kerosene fraction.

Such gas oils may be processed in a hydrodesulphurisation (HDS) unit so as to reduce their sulphur content to a level suitable for inclusion in a diesel fuel composition.

The base fuel used in a composition according to the present invention may itself be or contain a Fischer-Tropsch derived fuel component, in particular a Fischer-Tropsch derived gas oil. Such fuels are known and in use in automotive diesel and other middle distillate fuel compositions. They are, or are prepared from, the synthesis products of a Fischer-Tropsch condensation reaction. The fuel composition will suitably contain a major proportion of the middle distillate base fuel. A "major proportion" means typically 80 wt % or greater, more suitably 90 or 95 wt % or greater, most preferably 98 or 99 or 99.5 wt % or greater.

The middle distillate base fuel may also be a non-Fischer-Tropsch derived, for example petroleum derived, base fuel.

The middle distillate fuel according to the present invention will usually comprises a mixture of two or more middle distillate, in particular diesel, fuel components of the types described above.

It further contains a so-called "biodiesel" fuel component such as a vegetable oil or vegetable oil derivative (e.g. a fatty acid ester, in particular a fatty acid methyl ester) or another oxygenate such as an acid, ketone or ester, in an amount of from 1 to 95 vol %, preferably of from 1 to 10 vol %, more preferably from 3 to 8 vol %, and yet more preferably of from 4 to 6 vol %, since at higher concentrations the effectiveness of component (b) becomes diminished. Examples of such "biodiesel" fuels are rapeseed oil methyl ester, soybean oil methyl ester and other fatty acid methyl esters.

The concentration of component (b) depends on the amount of biodiesel in the fuel blend, since component (b) is added to counterbalance the amount of such fuel components transferred to the engine lubricating oil. Other factors are the required boiling range curves that generally might limit the amount of heavier components in such fuel blend. Preferably, the concentration of the base oil component (b) is chosen such as to overcome a decrease of 15% of the kinematic viscosity at 100° C. in the engine lubricating oil, more preferably at decrease of 10%, and most preferably a decrease of 5%. This will allow balancing the uptake of biodiesel components to a certain level without dramatically changing the lubricating oil properties, thereby elongating the interval until the lubricating oil needs to be changed.

The concentration of component (b), in a fuel composition according to the present invention, may be 0.05 wt % or greater, for example 0.1 or 0.2 or 0.5 or 1 or 1.5 wt % or greater. It may be 10 wt % or lower, for example 8 or 6 or 5 wt %, or lower. In cases it may be 1 wt % or lower, or 0.5 wt % or lower. It may, for instance, be from 0.1 to 4 wt %, or from 0.5 to 3 wt %, or from 1 to 2.5 wt %, such as around 2 wt %. In some fuel compositions it may be from 0.1 to 1 wt %, or from 0.1 to 0.5 wt %. It may, for example, be between 0.1 and 10 wt % based on the overall fuel composition, or between 0.5 and 5 wt %, or between 1 and 3 wt %. All concentrations, unless otherwise stated, are quoted as percentages of the overall fuel composition.

The concentration of component (b) will generally be chosen to ensure that the density, viscosity, cetane number, calorific value and/or other relevant properties of the overall fuel composition are within the desired ranges, for instance within commercial or regulatory specifications.

A fuel composition according to the present invention will preferably be, overall, a low or ultra low sulphur fuel composition, or a sulphur free fuel composition, for instance containing at most 500 ppmw, preferably no more than 350 ppmw, most preferably no more than 100 or 50 ppmw, or even 10 ppmw or less, of sulphur.

In particular, where the fuel composition is an automotive diesel fuel composition, it will suitably comply with applicable standard specification(s) such as for example EN 590 (for Europe) or ASTM D-975 (for the USA). By way of example, the fuel composition may have a density from 0.82 to 0.845 g/cm$^3$ at 15° C.; a final boiling point (ASTM D86) of 360° C. or less; a cetane number (ASTM D613) of 51 or greater; a kinematic viscosity (ASTM D445) from 2 to 2.5 mm$^2$/s (2 to 4.5 centistokes) at 40° C.; a sulphur content (ASTM D2622) of 350 ppmw or less; and/or a polycyclic aromatics content (IP 391(mod)) of less than 11% m/m. Relevant specifications may, however, differ from country to country and from year to year and may depend on the intended use of the fuel composition.

A fuel composition according to the present invention—in particular when it is an automotive diesel fuel composition—may contain other components in addition to the middle distillate base fuel and the Fischer-Tropsch derived paraffinic heavy base oil. Such components will typically be present in fuel additives. Examples are detergents; lubricity enhancers; dehazers, anti-foaming agents; ignition improvers (cetane improvers) such as those disclosed in U.S. Pat. No. 4,208,190 at column 2, line 27 to column 3, line 21); anti-rust agents; corrosion inhibitors; reodorants; anti-wear additives; anti-oxidants; metal deactivators; static dissipator additives; combustion improvers; and mixtures thereof.

Detergent-containing diesel fuel additives are known and commercially available. Such additives may be added to diesel fuel compositions at levels intended to reduce, remove, or slow the build up of engine deposits.

Examples of detergents suitable for use in fuel additives for the present purpose include those described for example in GB-A-960493, EP-A-0147240, EP-A-0482253, EP-A-0613938, EP-A-0557516 and WO-A-98/42808.

A middle distillate fuel composition, in particular a diesel fuel composition, preferably includes a lubricity enhancer, in particular when the fuel composition has a low (e.g. 500 ppmw or less) sulphur content. A lubricity enhancer is conveniently used at a concentration of less than 1000 ppmw, preferably from 50 to 1000 or from 100 to 1000 ppmw, more preferably from 50 to 500 ppmw. Suitable commercially available lubricity enhancers include ester- and acid-based additives. Other lubricity enhancers are described in the patent literature, in particular in connection with their use in low sulphur content diesel fuels, for example in:

Danping Wei and H. A. Spikes, "*The Lubricity of Diesel Fuels*", Wear, III (1986) 217-235;

WO-A-95/33805—cold flow improvers to enhance lubricity of low sulphur fuels;

WO-A-94/17160—certain esters of a carboxylic acid and an alcohol as fuel additives for wear reduction in a diesel engine injection system;

U.S. Pat. No. 5,490,864—certain dithiophosphoric diester-dialcohols as anti-wear lubricity additives for low sulphur diesel fuels; and WO-A-98/01516—certain alkyl aromatic compounds having at least one carboxyl group attached to their aromatic nuclei, to confer anti-wear lubricity effects particularly in low sulphur diesel fuels.

It may also be preferred for the fuel composition to contain an anti-foaming agent, more preferably in combination with an anti-rust agent and/or a corrosion inhibitor and/or a lubricity enhancing additive.

Unless otherwise stated, the concentration of each additional component in the fuel composition is preferably up to 10000 ppmw, more preferably in the range from 0.1 to 1000 ppmw, advantageously from 0.1 to 300 ppmw, such as from 0.1 to 150 ppmw. (All additive concentrations quoted in this specification refer, unless otherwise stated, to active matter concentrations by mass.)

The total additive content in the fuel composition may suitably be from 50 to 10000 ppmw, preferably below 5000 ppmw.

Additives may be added at various stages during the production of a fuel composition; those added at the refinery for example might be selected from anti-static agents, pipeline drag reducers, flow improvers (e.g. ethylene/vinyl acetate copolymers or acrylate/maleic anhydride copolymers), lubricity enhancers, anti-oxidants and wax anti-settling agents. When carrying out the present invention, a base fuel may already contain such refinery additives. Other additives may be added downstream of the refinery.

Where a fuel composition according to the present invention contains one or more cold flow additives, for example flow improvers and/or wax anti-settling agents, such additives may be present at reduced concentrations due to the presence of the Fischer-Tropsch derived paraffinic heavy base oil.

According to the present invention there is also provided use of a Fischer-Tropsch derived paraffinic base oil component in a middle distillate fuel composition, for the purpose of increasing the viscosity of an engine lubricating oil in an engine in which said fuel composition is used.

According to the present invention there is further provided use of a Fischer-Tropsch derived paraffinic base oil component in a middle distillate fuel composition, for the purpose of increasing the viscosity of an engine lubricating oil in an engine in which said fuel composition is used, wherein said viscosity has been reduced by biodiesel components in said fuel composition.

According to a further aspect of the present invention, the Fischer-Tropsch derived paraffinic base oil component may be used for the additional purpose of increasing the cetane number or calorific value or viscosity, or improving the lubricity, of a fuel composition, or changing the nature or level of emissions caused during use in a fuel consuming system, in particular an automotive diesel engine. The base oil component may be used for the purpose of improving the acceleration and/or other measures of engine performance in an engine running on the fuel composition.

As discussed above, during combustion in diesel engines, a portion of the fuel can enter the engine lubricating oil. This can occur, in particular, during regeneration of a diesel particulate filter. This effect, which can be referred to as "fuel dilution", can cause a reduction of the viscosity of the engine lubricating oil, which may lead to increased engine wear. The following Examples show how a fuel composition, i.e. a diesel fuel plus a high viscosity component, influences and reduces this effect.

EXAMPLES

Two different fuel formulations were tested, namely:
Fuel A Mineral base fuel containing 5% vol fatty acid methyl ester mainly based on rapeseed oil methyl ester (ex. ADM, Hamburg, Germany); and
Fuel B Fuel A containing 5% vol Fischer-Tropsch derived extra heavy base oil (ex. Shell Bintulu)
The properties of Fuel A were as set out in Table 1:

TABLE 1

| Fuel Property | | Test method |
|---|---|---|
| Density @ 15° C. (kg/m³) | 838.6 | DIN EN ISO 12185 |
| Viscosity @ 40° C. (mm²/s) | 3.1726 | DIN EN ISO 3104 |
| Distillation (° C.) | | DIN EN ISO 3405 |
| IBP | 171.9 | |
| 10% | 226.0 | |
| 30% | 259.5 | |
| 50% | 283.6 | |
| 70% | 310.0 | |
| 90% | 341.5 | |
| 95% | 354.6 | |
| FBP | 363.8 | |

In Table 2 are shown the values of certain properties of Fuel B:

TABLE 2

| Fuel Properties | | |
|---|---|---|
| | Density @ 15° C. (kg/m³) | Viscosity at 40° C. (mm²/s) |
| Fuel B | 838.2 | 3.779 |

The properties of the extra heavy base oil in Fuel B were as shown in Table 3:

TABLE 3

| Property | | Test method |
|---|---|---|
| Viscosity @ 40° C. (mm²/s) | 163.72 | DIN EN ISO 3104 |
| Viscosity @ 100° C. (mm²/s) | 19.321 | DIN EN ISO 3104 |
| Density @ 15° C. (kg/m³) | 837.5 | DIN EN ISO 12185 |
| Flame point (° C.) | 252.0 | DIN EN ISO 2719 |

Test Conditions

The fuel formulations were tested in an OM646 Mercedes Benz common rail engine under the conditions shown in Table 4:

TABLE 4

| Engine speed | rpm | 1500 |
|---|---|---|
| Engine torque | Nm | 26 |
| Start of Main Injection (Crank Angle) | °bTDC | −10 |
| Start of Post Injection (Crank Angle) | °bTDC | −38 |
| Quantity Post Injection (fuel) | mm³/stroke | 10 |

To shorten the test duration, operating conditions were chosen such that the fuel dilution rate into the lubricating engine oil was high, e.g. in a soot filter regeneration mode. The engine was run continuously under steady state conditions with active post injection at low engine speed and engine load, to simulate operating conditions for soot filter regeneration (high exhaust gas temperature).

For that purpose the injection timings of the main and post injections were delayed compared to normal operation. The ratio of the injected fuel quantity between main and post injection was 2:3. Every two hours, oil samples were taken for analysis of the engine lubricating oil viscosity. For security reasons, the engine was under idle conditions when the oil samples were taken. Engine operating conditions were monitored at all times.

After 10 hours, the engine test was stopped as the engine lubricating oil viscosity was under the limit of its initial SAE viscosity range (5W30). The fraction of the fuel in the engine lubricating oil was greater than 10% m/m after 10 hours. The test was conducted with the three different fuel compositions as described above, to show the influence of the fuel additives on the engine lubricating oil viscosity under such operating conditions.

The viscosity of the engine lubricating oil was measured at 100° C. as per DIN EN 3104. The results of the analysis are shown in Table 5 (4 significant digits are shown as per DIN EN 3104):

TABLE 5

| Hours tested | Viscosity of engine lubricating oil @ 100° C. | |
| --- | --- | --- |
| | With Fuel A | With Fuel B |
| 0 | 11.71 | 11.71 |
| 2 | 10.83 | 10.95 |
| 4 | 10.35 | 10.53 |
| 6 | 9.912 | 10.14 |
| 8 | 9.626 | 9.768 |
| 10 | 9.252 | 9.436 |

It can be seen from the above results that when using Fuel B, the viscosity of the engine lubricating oil is less affected from the thinning effect of fuel dilution, as compared to when using Fuel A. The final viscosity (i.e. 9.436 mm$^2$/s), after 10 hours testing, is 2% greater than when using Fuel A (i.e. 9.252 mm$^2$/s), i.e. the base fuel case.

When using the Fuel A under the test conditions, the engine lubricating oil viscosity is so affected by fuel dilution that its end viscosity value is below 9.3 mm$^2$/s, which is the defined limit between SAE 30 (the class in which the oil belonged originally) and SAE 20. Being in an SAE class lower, the oil is recommended to be changed. The use of the described fuel components leads, therefore, to an increased oil drain interval (ODI). The use of the described fuel components compensates for the dilution caused by the fuel, and results in a longer ODI and better protection.

The presence of FAME (Fatty Acid Methyl Esters, also known as biodiesel) in diesel fuels tends to make the oil dilution effect even worse, since FAME will be enriched in the engine lubricating oil. Therefore, the presence of the described components would have an increased importance, particularly in the light of the fact that, at the present time, FAME are mandatory for the European market. Their mandatory inclusion is foreseen to increase in the coming years.

It is to be noted that the use of these components has a positive effect on the engine lubricating oil, whilst being a part of the fuel composition. If the oil dilution effect is increased, i.e. by the driving conditions or engine design, more of said fuel components enter the engine lubricating oil as well. Their regulatory beneficial effect will be increased as a consequence.

I claim:

1. A middle distillate fuel composition comprising (a) a middle distillate base fuel comprising at least in part a biodiesel fuel component, and (b) a Fischer-Tropsch derived paraffinic base oil component with a viscosity of at least 8 mm$^2$/s at 100° C., wherein in the paraffinic base oil component (b), the ratio of the percentage of epsilon methylene carbon atoms to the percentage of isopropyl carbon atoms is 8.2 or below.

2. The fuel composition of claim 1 wherein the Fischer-Tropsch derived paraffinic base oil component (b) is a heavy residual base oil.

3. The fuel composition of claim 1 wherein the middle distillate base fuel (a) is a diesel base fuel.

4. The fuel composition of claim 2 wherein the base fuel (a) comprises a Fischer-Tropsch derived base fuel.

5. The fuel composition of claim 1 wherein the base oil component (b) has a pour point of −30° C. or lower.

6. The fuel composition of claim 1 wherein the concentration of the base oil component (b) is chosen such as to overcome a decrease of 15% in the kinematic viscosity at 100° C. of an engine lubricating oil present in an engine in which the fuel composition is used.

7. The fuel composition of claim 6 wherein the Fischer-Tropsch derived paraffinic base oil component (b) is a heavy residual base oil.

8. The fuel composition of claim 7 wherein the middle distillate base fuel (a) is a diesel base fuel.

9. The fuel composition of claim 2 wherein the concentration of the base oil component (b) is from 0.1 to 10 wt %.

10. The fuel composition of claim 3 wherein the concentration of the base oil component (b) is from 0.1 to 10 wt %.

11. The fuel composition of claim 4 wherein the concentration of the base oil component (b) is from 0.1 to 10 wt %.

12. The fuel composition of claim 1 wherein the concentration of the base oil component (b) is from 0.1 to 10 wt %.

13. The fuel composition of claim 5 wherein the concentration of the base oil component (b) is from 0.1 to 10 wt %.

14. The fuel composition of claim 6 wherein the concentration of the base oil component (b) is from 0.1 to 10 wt %.

* * * * *